United States Patent [19]
Kastl

[11] 4,416,529
[45] Nov. 22, 1983

[54] RACKS FOR DEVELOPING AND/OR FIXING FILM

[75] Inventor: Alfons Kastl, Munich, Fed. Rep. of Germany

[73] Assignee: AGFA-Gevaert Aktiengesellschaft, Leverkusen, Fed. Rep. of Germany

[21] Appl. No.: 372,102

[22] Filed: Apr. 27, 1982

[30] Foreign Application Priority Data

May 15, 1981 [DE] Fed. Rep. of Germany ....... 3119318

[51] Int. Cl.[3] .................... G03B 3/08
[52] U.S. Cl. .................... 354/320; 354/338; 226/189
[58] Field of Search ............... 354/338, 319, 316, 320, 354/321, 322, 339; 134/64 P, 122 P; 226/108, 109, 189; 242/55.01

[56] References Cited

U.S. PATENT DOCUMENTS

| | | | |
|---|---|---|---|
| 3,523,498 | 8/1970 | Phleps | 354/321 |
| 3,672,290 | 7/1972 | Duesler | 354/321 |
| 4,134,663 | 1/1979 | Laar et al. | 354/321 |
| 4,344,690 | 8/1982 | Viehrig et al. | 354/321 |

FOREIGN PATENT DOCUMENTS

| | | | |
|---|---|---|---|
| 1497395 | 10/1974 | Fed. Rep. of Germany | 354/321 |

*Primary Examiner*—A. A. Mathews
*Attorney, Agent, or Firm*—Kontler, Grimes & Battersby

[57] ABSTRACT

An arrangement for developing or fixing film has a container for accommodating a developing or fixing solution. A pair of spaced strips or sheets extend across the container. The surfaces of the strips or sheets which face one another are provided with a series of aligned slots. The slots are designed to receive roller racks for transporting film through the developing of fixing solution. The spacing and arrangement of the slots are such that several racks having the same width, or several racks having different widths, may be arranged side-by-side in the container. Each rack has a main gear which drives all of the rolls of the respective rack. The main gears of adjacent racks are coupled to one another while the main gear of one of the racks is further connected to a drive located outside of the container. This drive thus actuates all of the racks in the container. The racks have alignment rods for aligning the racks relative to one another and to the container. The arrangement makes it possible to process several films simultaneously regardless of whether or not the various films have the same width or different widths. The racks may have different lengths so that different dwell times in the developing or fixing solution may be obtained. This makes it possible to simultaneously process films having different sensitivities and/or films produced by different manufacturers.

20 Claims, 4 Drawing Figures

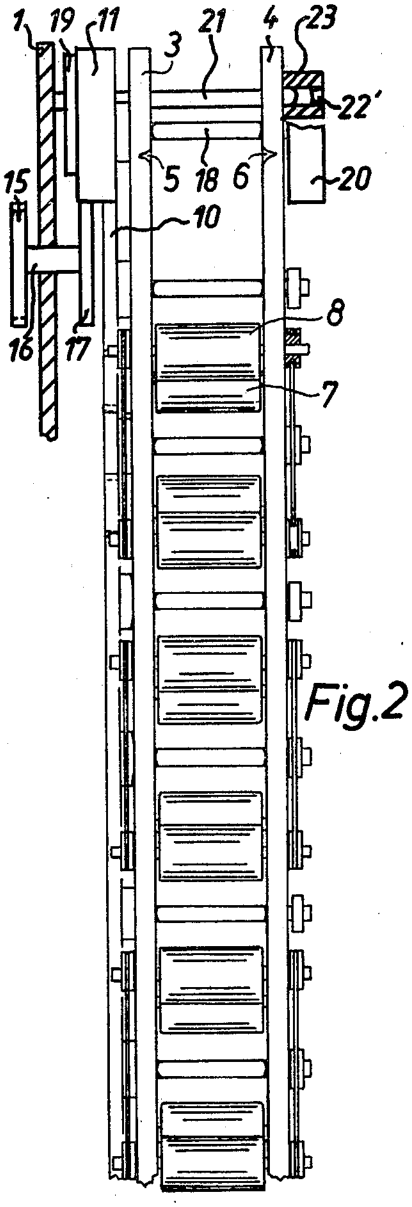
Fig.2
Fig.1
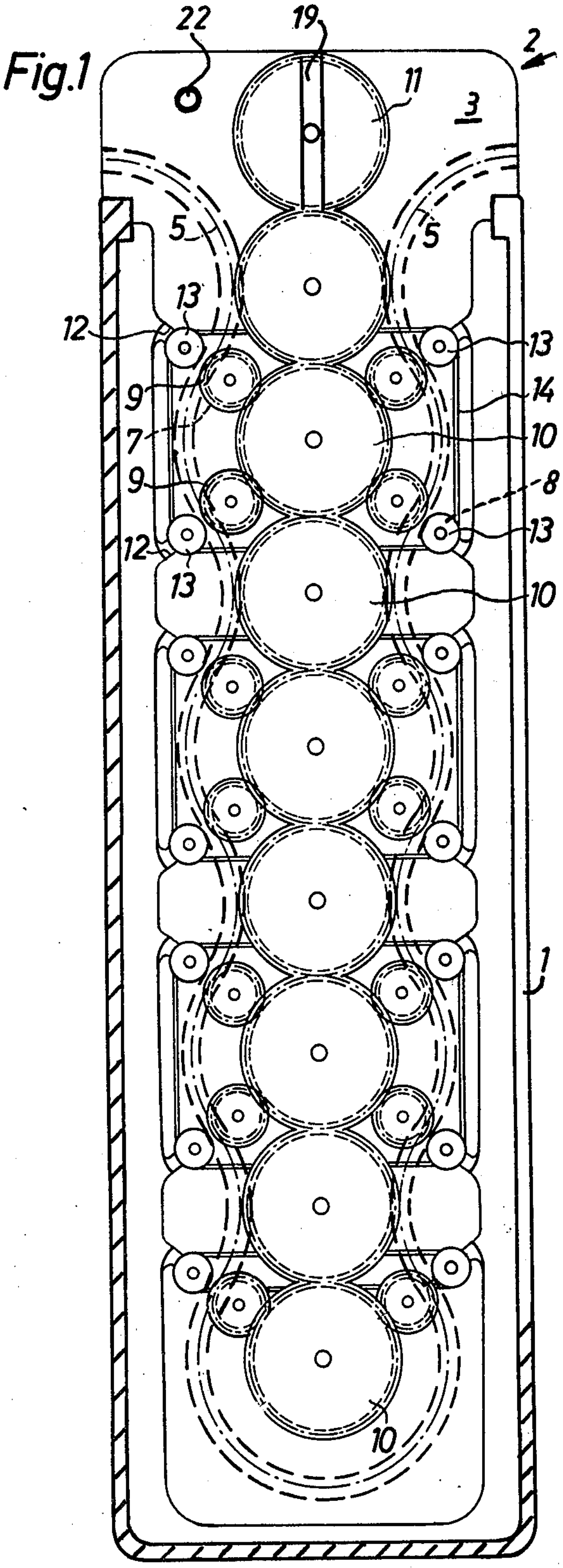

RACKS FOR DEVELOPING AND/OR FIXING FILM

BACKGROUND OF THE INVENTION

The invention relates generally to an arrangement for processing radiation-sensitive articles.

More particularly, the invention relates to an arrangement for developing and fixing film.

The German patent no. 14 97 395 discloses an arrangement for processing rolls of film having a predetermined size. The arrangement includes a succession of processing tanks which receive racks for transporting the film through the processing baths. Individual drives are provided for the various racks and are all connected with a main drive.

Each rack includes a plurality of pairs of conveying rollers driven by a main gear which is adapted to engage the individual drive for the respective rack. The rack has a pair of lateral walls provided with aligned grooves which receive the edges of the film and guide the same along a U-shaped path.

The width of the rack corresponds to that of the film. In particular, the rack is capable of accommodating film having a width of 105 mm. which is the largest width readily available commercially for film in the form of rolls.

There has recently been a trend in the medical field to make movies on 35 or 16 mm. film. X-ray pictures are also made on films having other widths such as 100, 90 and 70 mm. In other areas such as, for example, the microfilm industry and amateur photography, filmstrips having widths of 8, 16 and 35 mm. are used.

In order to enable processing of a specific type of film, the size of the rack must be adjusted to the width of such film. However, when processing film having a width less than the maximum width which can be accommodated by the processing arrangement, a portion of the latter is not utilized. For small widths, such portion may represent a substantial fraction of the capacity of the processing arrangement, e.g. two-thirds of the arrangement remains unused during processing of 16 mm. film. The unused capacity of the processing arrangement represents waste and hence leads to increased costs.

OBJECTS AND SUMMARY OF THE INVENTION

It is an object of the invention to provide a processing arrangement for radiation-sensitive articles which enables the unused capacity to be minimized.

Another object of the invention is to provide a processing arrangement of the type outlined above which is capable of processing films of different width simultaneously.

An additional object of the invention is to provide a processing arrangement for radiation-sensitive articles which is more flexible than the known processing arrangements.

A concomitant object of the invention is to provide a processing arrangement which is capable of processing radiation-sensitive articles requiring different processing times simultaneously.

The preceding objects, as well as others which will become apparent as the description proceeds, are achieved by the invention.

One aspect of the invention relates to an arrangement for processing radiation-sensitive articles, particularly for developing and fixing film whether in the form of rolls or in the form of discrete sheets or strips. The arrangement includes a container for accommodating a processing medium, e.g. a developing or fixing solution, for radiation-sensitive articles, a first conveying device or rack for conveying the articles along a first path and a second conveying device or rack for conveying the articles along a second path. Guide means is provided in the container for removably positioning the racks therein. The racks are receivable in the container simultaneously and the guide means is arranged to position the racks such that the paths are out of alignment with one another, that is, such that neither path constitutes a continuation of the other. For instance, the racks may be arranged side-by-side. The arrangement further comprises a drive for the racks and coupling means for coupling the racks to one another and to the drive in such a manner that one of the racks transmits driving force from the drive to the other of the racks.

According to one embodiment of the invention, each rack has a main driving member or gear which is capable of engaging and being driven by the drive. The main gear, in turn, drives pairs of cooperating rollers which transport the radiation-sensitive articles along the respective path. Such path may be U-shaped. The rack may have a pair of lateral walls provided with aligned grooves which define the respective path and are adapted to receive the edges of the radiation-sensitive articles so as to guide the latter along such path.

The various racks may be capable of accommodating articles having the same width or different widths.

The invention makes it possible to increase the processing capacity. For example, the arrangement of the invention is capable of simultaneously processing three 16 mm. films, or a 35 mm. film and a 16 mm. film, or two 35 mm. films. or a 70 mm. film and a 16 mm. film.

Another embodiment of the arrangement makes it possible to simultaneously process articles, e.g. films made by different manufacturers or films having different sensitivities, which require different processing times. This is achieved in that the racks define paths of different length. For example, one of the racks may be shorter or longer than the other or others.

The novel features which are considered as characteristic of the invention are set forth in particular in the appended claims. The improved processing arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a cross-sectional side view of a processing arrangement according to the invention;

FIG. 2 is a cross-sectional front view of a portion of the arrangement of FIG. 1;

DESCRIPTION OF THE PREFERRED EMBODIMENTS

Figure 3:
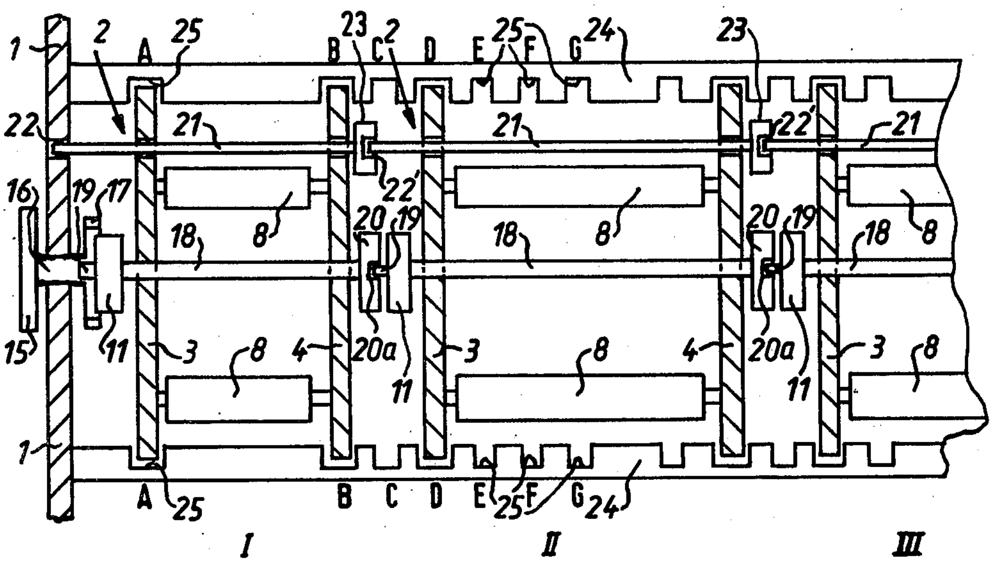
FIG. 3 is a cross-sectional plan view of an arrangement according to the invention capable of processing several articles of different width simultaneously.

FIGS. 1 and 2 illustrate an arrangement which may be used for developing and/or fixing film in the form of rolls or in the form of discrete strips or sheets.

The arrangement includes a container or tank 1 which accommodates a non-illustrated bath of a developing or fixing solution. A rack or conveying device 2 for transporting the film through the container 1 is removably received in the latter.

As best seen in FIG. 2, the rack 2 includes a pair of lateral walls or side walls 3 and 4 which are maintained at a fixed distance from one another in a conventional manner by non-illustrated spacers, e.g. bolts. The surface of the wall 3 which confronts the wall 4 is provided with a groove 5 while the surface of the wall 4 which confronts the wall 3 is provided with a groove 6. The grooves 5 and 6, which are adapted to receive the edges of the film, are aligned with one another and define the path to be followed by the film. As illustrated in FIG. 1, the grooves 5 and 6 are serpentine but define a generally U-shaped path. The terminal ends of the grooves 5 and 6 which are located in the regions of the upper ends of the respective walls 3 and 4 are generally horizontal.

Conveying rolls 7 and 8 are arranged at the points of inflection of the serpentine path defined by the grooves 5 and 6. The rolls 7 are rotatably mounted on shafts which project into openings provided in the walls 3 and 4. A gear 9 is mounted on the end of each shaft adjacent the outer side of the wall 3 and meshes with one of a series of centrally located gears 10 arranged in a column. The gears 10, in turn, mesh with one another and the uppermost of the gears 10 engages a main gear or driving member 11 located in the region of the upper end of the rack 2. Each of the gears 9 is thus coupled to the main gear 11. Upon insertion of the rack 2 into the container 1, all of the gears 9, and hence all of the rolls 7, may be connected with a common drive in a known manner by engaging the main gear 11 with a drive.

The rolls 7 and 8 are arranged in pairs. The rolls 8, which are located to the outside of the rolls 7, are mounted for movement towards and away from the respective rolls 7 in grooves 12 provided in the walls 3 and 4. Each of the rolls 8 has a shaft which carries a grooved wheel 13 at either end thereof.

It will be observed from FIG. 1 that the rolls 7 and 8 are divided into groups with the rolls 7 of each group engaging a common gear 10. In the illustrated embodiment, there are three groups having four each of the rolls 7 and 8 and one group having two each of the rolls 7 and 8. The wheels 13 at either side of the rolls 8 of each group are connected by an endless elastic belt 14 which is received in the grooves of the respective wheels 13. The belts 14 urge the rolls 8 towards the respective rolls 7.

Referring once more to FIG. 2, the processing arrangement has a drive which includes a gear 15 located externally of the container 1 and connected with a suitable, non-illustrated drive means, e.g. via a belt. The gear 15 is mounted on the outer end of a shaft 16 which extends through an opening in the container 1 and carries a gear 17 at its inner end. The gear 17 meshes with the main gear 11 of the rack 2 which is wider than, e.g. twice as wide as, the gear 17. As mentioned previously, the main gear 11 also meshes with the uppermost of the column of central gears 10. Accordingly, all of the rolls 7 of the rack 2 are driven by the gear 15.

With regard to FIG. 3, it is noted that the same reference numerals as in FIGS. 1 and 2 have been used to identify similar components. FIG. 3 illustrates that several racks 2 having different widths may be arranged sde-by-side in the container 1. FIG. 3 further shows how these various racks 2 may be coupled to the single drive 15. Three of the racks 2 are illustrated in FIG. 3 and are respectively located at the positions identified by the roman numerals I, II and III.

Referring to FIGS. 1 and 2 in conjunction with FIG. 3, it will be observed that the main gear 11 of a rack 2 is mounted at one end of a shaft 18 which extends through the walls 3 and 4 of the rack 2. An elongated, bar-like projection or coupling element 19 is provided on that side of the main gear 11 which faces away from the shaft 18. The end of the shaft 18 remote from the main gear 11 carries another coupling element 20 which may be in the form of a slotted screw head. The slot 20*a* of the coupling element 20 is dimensioned to readily receive the projection 19 on the main gear 11. As shown in FIG. 3, the projection 19 of one rack 2 may be inserted in the slot 20*a* of a neighboring rack 2. In this manner, the main gears 11, and hence the rolls 7, of each of the racks 2 in the container 1 may be coupled to the gear 15. Thus, the gear 11 of the rack 2 in the position I is directly driven by the gear 15 while the main gears of the racks 2 in the positions II and III are indirectly driven by the gear 15 via the shafts 18 and the coupling elements 19 and 20, 20*a*.

As best seen in FIGS. 2 and 3, each of the racks 2 is also provided with an alignment rod 21. Similarly to the shaft 18, the alignment rod 21 extends through the walls 3 and 4 of the rack 2. One end of the alignment rod 21 has a head 23 provided with a recess 22'. The recess 22' is adapted to be aligned with an opening 22 in the container 1. The opening 22 and the recess 22' are dimensioned to receive the end of the alignment rod 21 remote from the head 23. This arrangement makes it possible to align the various racks 2 in the container 1 relative to the latter and to one another. Thus, the alignment rod 21 of the rack 2 in the position I is received in the opening 22 of the container 1 via a non-illustrated spring. The alignment rod 21 of the rack 2 in the position II is, in turn, received in the recess 22' of the rack 2 in the position I. Similarly, the alignment rod 21 of the rack 2 in the position III is received in the recess 22' of the rack 2 in the position II.

As further shown in FIG. 3, spaced, elongated guides or confining members 24 extend across the container 1, that is, between the side walls of the container 1, transversely of the film paths. A plurality of vertical slots 25 is formed in that surface of each of the guides 24 which faces the other guide 24. The slots 25 in the opposed guides 24 are aligned with one another. The slots 25 are sufficiently wide to receive the walls 3 and 4 of the racks 2 and serve to position the racks 2 in the container 1. The number of slots 25 and the distances between the same and the side walls of the container 1 depend upon the types of racks 2 which it is desired to use. For example, the processing arrangement of FIG. 3 is designed so that racks 2 of six different widths may be placed in the position I. Thus, a single slot 25 is provided at the location A for that one of the walls 3 and 4 of a rack 2 which is to be situated nearest the side wall of the container 1. In the present case, the wall 3 is located adjacent the side wall of the container 1. On the other hand, six slots 25 are arranged side-by-side at the locations B-G for that one of the walls 3 and 4 of a rack 2 remote from the side wall of the container 1. The distances between the location A and the locations B-G are determined by the widths of the racks 2 which are to be utilized. The remaining slots 25 are similarly designed to thereby enable several racks 2 of the same width or various combinations of racks 2 of different widths to be accommodated in the container 1.

In operation, a rack 2 is first placed in the position I so that one of the walls 3 and 4 is received in the slots 25 at the location A, namely, the slots 25 nearest that side wall of the container 1 which supports the gear 15. Subsequently, another rack 2, which may have a different width than the previous rack 2, is placed in the position II. The projection 19 on the main gear 11 of the second rack 2 is inserted in the slot 20*a* of the first rack 2. In addition, the alignment rod 21 of the second rack 2 is inserted in the recess 22' of the first rack 2 so as to align the racks 2 in the positions I and II relative to one another. A third rack 2 may be placed in the position III and similarly coupled and aligned relative to the rack 2 in the position II. In the event that the film passes successively through several processing containers such as the container 1, it will be understood that all of the racks 2 in the positions corresponding to the position I will have the same width and likewise for all of the racks 2 in the positions corresponding to the positions II and III.

The development and fixing of the film may be accomplished in a known manner.

The invention makes it possible to simultaneously process several films having different widths, as well as several films having the same width, in a single processing arrangement. However, it may be desired to simultaneously process different types of film and/or films having different sensitivities in one and the same processing arrangement. Since different types of film and/or films having different sensitivities may require different dwell times in a given processing bath, regulation of the transport speed of the film would normally be necessary in order to compensate for the differences in dwell times. In order to avoid the necessity for controlling the transport speed of the film, the invention proposes to compensate for the differences in dwell times by providing paths of different lengths for films having different sensitivities and/or for different types of film. In accordance with one embodiment of the invention, this is achieved by making the racks 2 in various lengths.

Figure 4:
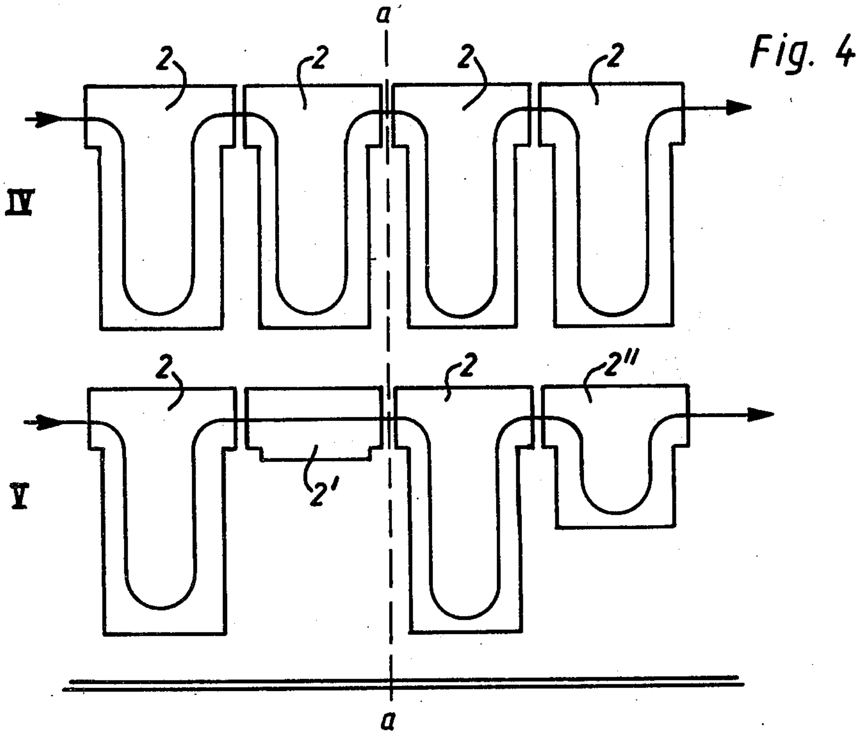
FIG. 4 illustrates an embodiment of an arrangement according to the invention for achieving different processing times.

FIG. 4 illustrates two series of racks which are located next to one another at respective positions IV and V and are designed to provide different dwell times. In FIG. 4, it is assumed that the racks situated on the left-hand side of the dashed line a—a are accommodated in a common developing bath while the racks on the right-hand side of the dashed line a—a are accommodated in a common fixing bath. The paths followed by the film are indicated by arrows.

The series of racks at the position IV is designed to provide long dwell times and is made up of racks 2 of normal length. In the illustrated embodiment, two of the racks 2 are provided in the developing bath and two of the racks 2 are provided in the fixing bath.

The series of racks at the position V is designed such that the dwell time in the developing bath is 50% of that at the position IV while the dwell time in the fixing bath is 75% of that at the position IV. To this end, the racks which are accommodated in the developing bath at the position V include a normal rack 2 and a short downstream bridging rack 2' through which the film is transported without contacting the developing bath. On the other hand, the racks immersed in the fixing bath at the position V include a normal rack 2 and a downstream rack 2'' which is one-half as long as the preceding rack 2 and thus provides one-half the dwell time of such rack 2. The combination of the normal rack 2 and the rack 2'' having one-half the length thereof results in a dwell time in the fixing bath which is 75% of that at the position IV.

It will be appreciated that the embodiment of FIG. 4 is exemplary and that any rack lengths and combinations thereof may be used to achieve desired dwell times.

It will be understood that different rack lengths and widths may be combined in order to satisfy the processing requirements for varying combinations of film.

The invention makes it possible to readily increase the capacity of arrangements for developing and/or fixing film. In this regard, an important advantage of the invention resides in that processing arrangements already in existence may be easily converted so as to conform to the invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. An arrangement for processing radiation-sensitive articles, particularly for developing and fixing film, comprising:

(a) a container for accommodating a processing medium for radiation-sensitive articles;

(b) a first conveying device for conveying radiation-sensitive articles having first dimensions along a first path;

(c) a second conveying device for conveying radiation-sensitive articles having second dimensions different from said first dimensions along a second path, said devices having different dimensions;

(d) guide means in said container for removably positioning said devices therein, said devices being receivable in said container simultaneeously, and said guide means being arranged to position said devices such that said paths are out of alignment with one another;

(e) a drive for said devices; and (f) coupling means for coupling said devices to one another and to said drive in such a manner that one of said devices transmits driving force from said drive to the other of said devices, said coupling means comprising a driving member on each of said devices adapted to be coupled to said drive, first coupling elements on said driving members, and second coupling elements connected with said driving members and arranged to mate with said first coupling elements.

2. An arrangement for processing radiation-sensitive articles, particularly for developing and fixing film, comprising:

(a) a container for accommodating a processing medium for radiation-sensitive articles;

(b) a first conveying device for conveying radiation-sensitive articles along a first path;
(c) a second conveying device for conveying radiation-sensitive articles along a second path;
(d) guide means in said container for removably positioning said devices therein, said devices being receivable in said container simultaneously, and said guide means being arranged to position said devices such that said paths are out of alignment with one another;
(e) a drive for said devices; and
(f) coupling means for coupling said devices to one another and to said drive in such a manner that one of said devices transmit driving force from said drive to the other of said devices, said coupling means comprising a driving member on each of said devices adapted to be coupled to said drive, first coupling elements on said driving members, and second coupling elements connected with said driving members and arranged to mate with said first coupling elements.

3. An arrangement as defined in claim 2, wherein said first and second coupling elements are located on opposite sides of the respective device.

4. An arrangement as defined in claim 2, wherein said first coupling elements comprise bar-like projections and said second coupling elements comprise slotted members having slots dimensioned to receive said projections.

5. An arrangement for processing radiation-sensitive articles, particularly for developing and fixing film, comprising:
(a) a container for accommodating a processing medium for radiation-sensitive articles;
(b) a first conveying device for conveying radiation-sensitive articles along a first path;
(c) a second conveying device for conveying radiation-sensitive articles along a second path;
(d) guide means in said container for removably positioning said devices therein, said devices being receivable in said container simultaneously, and said guide means being arranged to position said devices such that said paths are out of alignment with one another;
(e) alignment means for aligning said devices relative to said container and to one another, said alignment means comprising an opening in said container, and rods mounted on said devices and receivable in said opening, each of said rods having a recess at one end thereof adapted to receive a neighboring rod;
(f) a drive for said devices; and
(g) coupling means for coupling said devices to one another and to said drive in such a manner that one of said devices transmits driving force from said drive to the other of said devices.

6. An arrangement for processing radiation-sensitive articles, particularly for developing and fixing film, comprising:
(a) a container for accommodating a processing medium for radiation-sensitive articles;
(b) a first conveying device for conveying radiation-sensitive artices along a first path;
(c) a second conveying device for conveying radiation-sensitive articles along a second path, each of said devices having a pair of spaced, lateral walls, and the walls of each device being provided with aligned grooves which define the respective path and are arranged to receive the edges of radiation-sensitive articles;
(d) guide means in said container for removably positioning said devices therein, said devices being receivable in said container simultaneously, and said guide means being arranged to position said devices such that said paths are out of alignment with one another;
(e) a drive for said devices; and
(f) coupling means for coupling said devices to one another and to said drive in such a manner that one of said devices transmits driving force from said drive to the other of said devices.

7. An arrangement as defined in claim 6, where said first device is arranged to convey radiation-sensitive articles having first dimensions and said second device is arranged to convey radiation-sensitive articles having second dimensions different from said first dimensions.

8. An arrangement as defined in claim 7, wherein the dimensions of said devices are different.

9. An arrangement as defined in claim 6, comprising a pair of spaced confining members in said container; and wherein said guide means comprises aligned slots in said confining members arranged to receive said devices.

10. An arrangement as defined in claim 9, wherein said confining members extend transversely of said paths and said slots are substantially vertical.

11. An arrangement as defined in claim 6, comprising alignment means for aligning said devices relative to said container and to one another.

12. An arrangement as defined in claim 6, wherein said paths have different lengths so that radiation-sensitive articles conveyed by said devices contact the processing medium for different lengths of time.

13. An arrangement as defined in claim 12, wherein said devices have different lengths.

14. An arrangement as defined in claim 6, wherein said paths are substantially parallel.

15. An arrangement as defined in claim 6, wherein said paths are substantially U-shaped.

16. An arrangement as defined in claim 6, wherein said guide means is arranged to position said devices side-by-side in said container.

17. An arrangement as defined in claim 6, wherein said guide means comprises generally vertical guide elements which are spaced from one another in a direction transverse to said paths by distances corresponding to the widths of said devices.

18. An arrangement as defined in claim 6, wherein the dimensions of said devices are fixed.

19. An arrangement as defined in claim 6, wherein said devices comprise pairs of cooperating, driven conveying rolls.

20. An arrangement as defined in claim 6, comprising at least one additional conveying device for conveying radiation-sensitive articles along a predetermined additional path, said additional device being receivable in said container simultaneously with said first and second devices and said guide means being arranged to position said additional device such that said additional path is out of alignment with said first and second paths, and said additional device including additional coupling means for coupling the same to said drive and said first and second devices.

* * * * *